Aug. 4, 1936.   G. A. LYON   2,049,458
TIRE COVER
Filed April 30, 1934   2 Sheets-Sheet 2
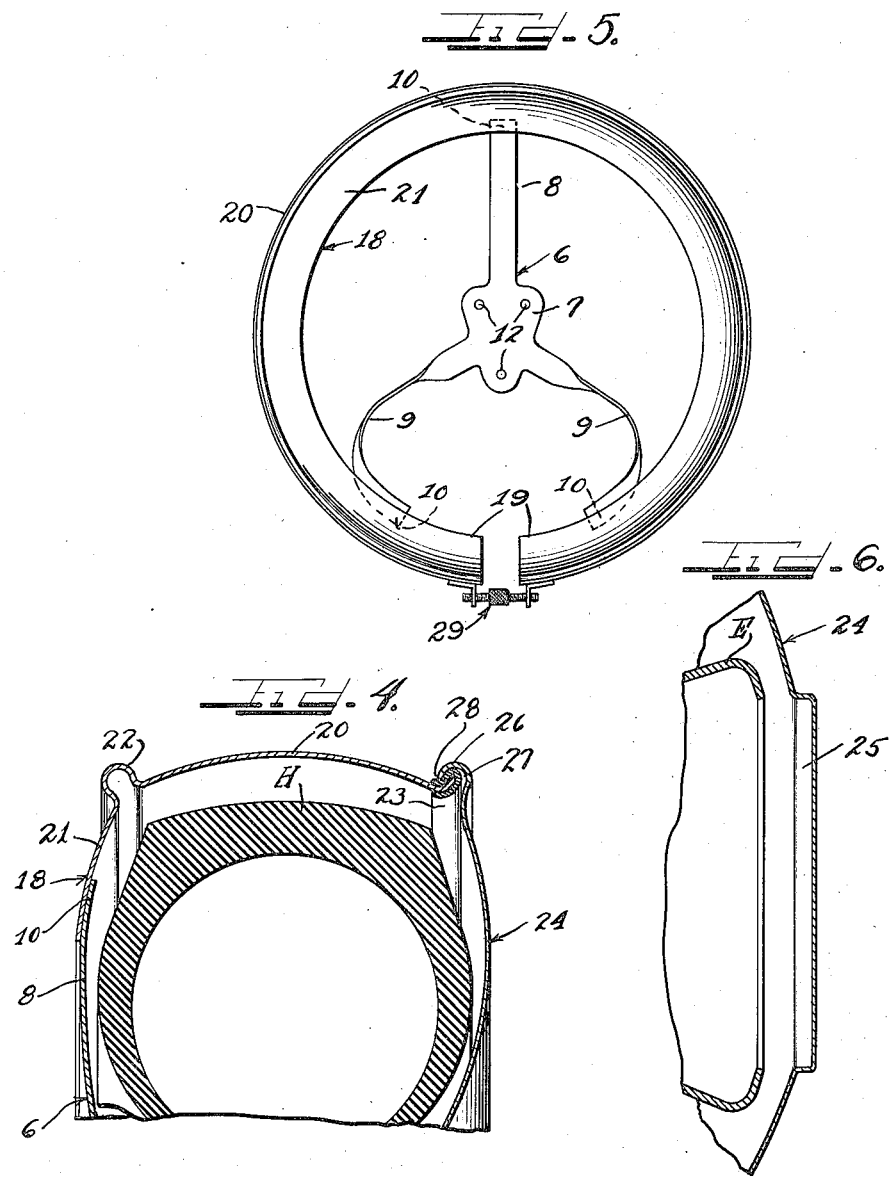
Inventor
George Albert Lyon.

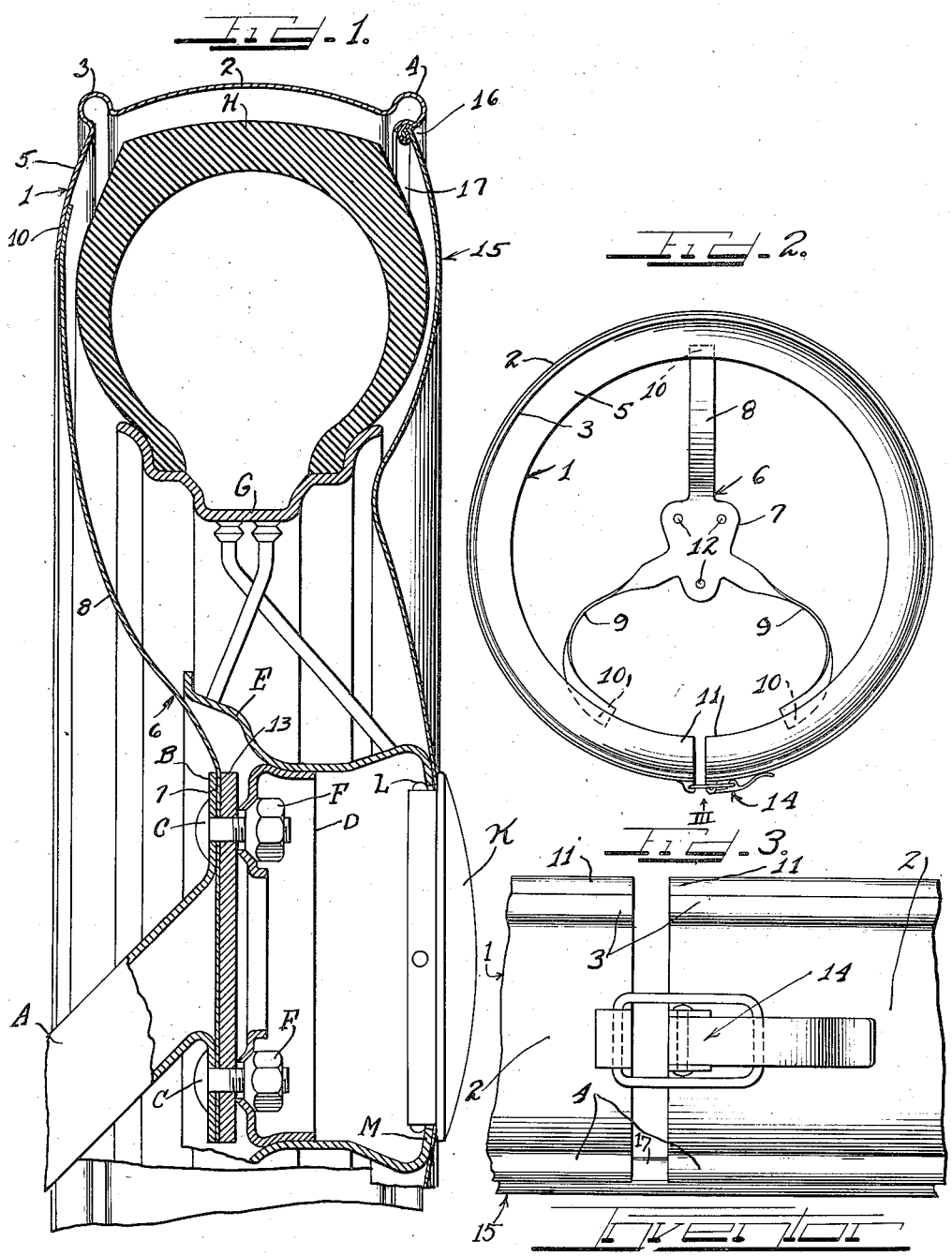

Patented Aug. 4, 1936

2,049,458

UNITED STATES PATENT OFFICE 2,049,458

TIRE COVER

George Albert Lyon, Detroit, Mich., assignor to Lyon Incorporated, Detroit, Mich., a corporation of Delaware Application April 30, 1934, Serial No. 723,046

9 Claims. (Cl. 150—54)

This invention has to do with tire covers and is concerned more particularly with a cover construction embodying an expansible and contractible cover member for holding another and cooperating cover member in position.

It is an object of this invention to provide a cover construction including a member for covering substantially the entire tread of a spare tire and embodying means whereby the same is permanently supported by the spare wheel carrier.

It is another object of the invention to provide such a cover member with means for interlockingly engaging another cover member to cooperate with the same in substantially covering the front and outer periphery of the spare wheel and tire.

It is another object of the invention to provide a resilient expansible and contractible tread covering member with means whereby the same may be permanently carried by the spare wheel carrier, together with a front cover member, whereby when the tread covering member is expanded, the members may be released from each other, and when the said member is contracted, the members may be interlocked.

It is a still further object of the invention to provide cover members of the character referred to, whereby the members are interlocked by expansion of the tread covering member and released upon contraction of the tread covering member.

In accordance with the general features of the invention, the tread covering member is in the form of a resilient split ring having suitable means such as toggle mechanism for contracting the same. A bracket carried by the split ring is arranged to be bolted or otherwise permanently secured to the spare wheel carrier. The tread covering member is provided with a peripheral recess and a second cover member arranged to conceal the entire front of the spare wheel and tire is arranged with its outer peripheral portion adapted to fit in said recess. When so fitting and the toggle or other suitable means is operated so as to contract the tread covering member, the same is interlocked with the front cover member. When the tread covering member is expanded, the front cover member is released and may be removed or applied, as desired. The bracket structure is preferably of such a character as to impart greater resilience to the tread covering member, which acts to hold itself contracted when the toggle mechanism is operated to cause the members to interlock.

In accordance with another form of the invention, the split ring is provided with means to expand the same, the front covering member being provided with a peripheral recess to receive a projecting portion of the tread covering member so that when the latter is expanded the members are interlocked.

Suitable cushion means provided between the interlocking portions serve to prevent rattling between the members.

The construction is of such a character that the spare wheel hub cap may be employed to temporarily hold the front cover member in place before the cover members are interlocked and after they are released, in the construction affording the interlocking engagement when the tread covering member is contracted, and if desired the front cover member may be formed continuous without an opening for the hub cap in the other construction since the projecting portion of the expansible and contractible member will support the front cover member even when the members are not interlocked.

The construction is accordingly of a character which permits of the ready application and removal of the front cover member and is arranged to accommodate spare tires of different sizes.

Other objects and advantages of the invention will appear as the description proceeds.

This invention (in preferred forms) is illustrated in the drawings and hereinafter more fully described.

On the drawings:

Figure 1 is a fragmentary central sectional view through a spare wheel carrier, spare wheel, tire and the cover construction embodying the invention, certain parts being shown for convenience in elevation.

Figure 2 is a rear elevational view of the tread covering cover member of the invention.

Figure 3 is an enlarged fragmentary bottom plan view of the structure at the bottom of Figure 2, looking in the direction of the arrow III.

Figure 4 is a view similar to the upper part of Figure 1 but shows a modified cover construction.

Figure 5 is a view similar to Figure 2 but showing the expanding and contracting means which could be employed with either the tread covering member of Figure 1 or of Figure 3.

Figure 6 is a fragmentary sectional view showing a front cover member which is continuous at its center.

As shown on the drawings:

Referring now more particularly to the drawings, a tire carrier A which is preferably permanently connected to the body or chassis of an automobile, either at the rear or at either side or at any other desired part of the vehicle, and is provided with a flange B carrying, preferably permanently, studs C arranged to project through openings in the attaching collar D of a spare wheel hub E to receive attaching nuts F, which nuts may also be employed for securing the wheel G in operative position to support the vehicle. The wheel may carry a spare tire H and the hub is formed to receive the skirt of a hub cap K through the opening in the front wall M of the hub to be releasably held by the springs L or other suitable means carried by the hub cap.

The tire cover comprises a rear cover member 1 having a rim portion 2 which is arranged to extend substantially entirely across the tread of the spare tire H and, for ornamental purposes and for a purpose to be hereinafter described, the tread covering portion 2 is bulged outwardly at its longitudinal edges to provide beads 3 and 4 adapted to be located adjacent the side edges of the tire tread. The portion 5 of the cover member 1 disposed rearwardly of the tread covering portion 2 is arranged to extend inwardly so as to cover the portion of the rear side wall of the tire adjacent the tread. The cover member 1 is preferably permanently supported as by the carrier A, and to this end, a spider bracket 6 having a central body 7, an upwardly extending arm 8 and downwardly extending arms 9 is provided. The arms 8 and 9 are preferably welded to the inner surface of the tire cover portion 5 as shown at 10, although if desired any other suitable fastening means may be made use of, such as brazing, riveting or the like. The lower arms 9 are shaped to form together a downwardly opening substantially C-shaped member whose ends are connected to the cover member 1 in spaced relation to the ends 11 of said cover member, the latter being split and preferably resilient. The bracket 6 is preferably formed of resilient material so as to enhance the resilient characteristics of the cover member 1, tending to urge the same to an expanded condition from the contracted condition shown in Figure 2. The head 7 of the spider 6 may have the same general contour of the carrier flange B which, in the illustrated example of the invention, is substantially triangular with its base uppermost. The head 7 is provided with bolt holes 12 through which the studs 6 project, and a retaining plate 13 is applied to the front surface of the head 7 and also has the studs C projecting therethrough, said retaining plate being permanently connected to the flange B as by welding or in any other suitable way. Any suitable contracting means such as the toggle mechanism 14 may be employed in conjunction with the cover member 1, although if desired a turnbuckle arrangement such as that shown at the bottom of Figure 5 could be employed.

The front cover member of the invention may be in the form of a plate 15 shaped cross sectionally to conform generally to the shape of the front of the spare wheel and tire and is formed preferably with a central opening of substantially the same size as the opening in the front wall M of the hub E, so as to allow the skirt of the hub cap K to pass therethrough and be interlocked with said wall M, the peripheral outer flange of the cap K in such case completely covering the opening in the cover member 15 and being resiliently urged thereagainst by the spring elements L to keep the cover member 15 from rattling. By means of the cap K, the front cover member 15 may be supported temporarily independently of the rear cover member 1.

To the end that the front cover member may be firmly interlocked with the rear cover member, the rear cover member, at the free forward margin thereof adjacent the front bead 4, is transversely curved to form an inwardly concave portion providing a peripheral groove 16 throughout substantially the length of the cover member 1. When the toggle mechanism 14 is loose, the diameter of the grooved portion is such as to allow the front cover member 15 to be readily passed into and out of such groove by movement of the cover member 15 axially relative to the cover member 1. Consequently, in applying the cover member 15, the same need merely be placed within the groove 16, fitting loosely therein, and then the same may be supported temporarily by the hand of the operator while the latter operates the toggle mechanism 14 so as to tightly interlock the front and rear cover members. Or, if desired, after the cover member 15 is positioned in the groove 16, the hub cap K may be applied to the position shown in Figure 1 and thereafter, the cover member 15 need not be held at all, the only part requiring attention being the toggle mechanism 14, which is thereupon operated to contract the grooved portion 16 about the outer periphery of the cover member 15. To the end that rattling between the cover members may be prevented, the outer peripheral margin of the cover member 15 is clinched about a strip of cushioning material 17 of rubber or the like, the latter being curled so as to embrace the outer periphery of said margin of the cover member 15 and thus be disposed between said margin and the grooved portion of the rear cover member 1.

The front cover member 15 could be made without a central opening as shown in Figure 6, although the construction embodying a central opening is preferred when a rear cover member such as the member 1 is employed.

In the form of the invention shown in Figures 4 and 5, the rear cover member 18 is preferably supported from the spare wheel carrier by a spider bracket which may be substantially identical with that designated generally by the numeral 6 and is substantially identical in all respects with that illustrated in Figures 1 and 2 and accordingly like reference characters in connection with this bracket are employed in Figures 3 and 4.

The rear cover member 18 is similar to the cover member 1 of Figures 1 and 2, being preferably made of resilient material and split to provide the ends 19. The cover member 18 has a tread covering portion 20 connected to the rear portion 21 by an outwardly projecting bead 22 which is disposed in a plane adjacent the rear edge of the tire tread. The forward margin of the tread covering portion 20 is turned forwardly and outwardly and is preferably tightly and permanently embraced by a strip of rubber or other suitable cushioning material 23.

The front cover member 24 is preferably of a shape similar to that of the front cover member 15 of Figure 1, and while the same may be provided with a central opening to accommodate the hub cap as in Figure 1, it may also be made without such opening as shown at 25 in Figure 6. The front cover member 24 has its outer peripheral margin bent rearwardly and inwardly to provide an inwardly concave bead 26 affording an inner recess 27 substantially coextensive with the cover member 24, which is preferably completely circular, although the same may be split if there is any desire for such a construction. The diameter of the free edge 28 of the portion 26 is sufficiently greater than the outer diameter of the cushioning material 23 when the cover member 18 is contracted by the turnbuckle or other suitable mechanism 29 as to permit the members 18 and 24 to readily telescope with each other. After they are brought in telescoping relationship, the mechanism 29 is operated so as to expand the rear cover member 18 and cause the cushioning material 23 and associated part of the tread covering portion 20 to pass into the recess 27 and be interlocked with the front cover member 24. When the front cover member 24 is to be removed, it is necessary merely to operate the mechanism 29 so as to enable the edge 28 to clear the outer peripheral portion of the cushioning material 23. When the cover member 18 is thus sufficiently contracted, the front cover member 24 will nevertheless be supported by reason of the fact that the upper portion of its pocket shaped margin 26 will be hooked over the cushioning material 23 and be supported thereby until such time as the operator is ready to remove it. By the same token, the front cover member 24 may be placed into the same supporting relation with respect to the cushioning material 23 and the attendant, by merely expanding the rear cover member 18, may cause the members to be interlocked.

In each illustrated form of the invention, the contracting and/or expanding mechanism 14 or 29 is preferably arranged in substantially the median plane of the respective tread covering portion of the rear cover member, although the same may be differently arranged.

The bracket 6 and tire cover members are preferably made of form-retaining material such as sheet metal, the bracket 6 and rear cover member being also preferably of resilient material for the purposes specified. The front cover member may be formed of any suitable sheet material such as sheet metal, fiber, hard rubber, phenolic condensation product or the like.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. Tire cover construction comprising a split substantially annular resiliently flexible part formed to cover substantially the entire tread of a spare tire, means extending rearwardly of the tire for yieldably securing said part to a vehicle so as not to interfere with the flexing of said part, a substantially circular planar part formed to cover the front wall of the tire, and means on said parts arranged to be interlocked when the first part is flexed in one direction and to be released when the first part is flexed in another direction.

2. Tire cover construction comprising a split substantially annular radially expansible and contractible part formed to cover a part of a spare tire, means extending rearwardly of the tire for yieldably securing said part to a vehicle so as not to interfere with the expansion and contraction of said part, a substantially circular planar part formed to cover another part of the tire, and means on said parts arranged to be interlocked when the first part is flexed in one direction and to be released when the first part is flexed in another direction.

3. Tire cover construction comprising a member formed to cover a part of a spare tire, means associated with said member for attaching the same to a vehicle, a cover member for another part of the tire, and means for interlocking said members so as to support the second member from the first member, the first member being expansible and contractible and said attaching means being flexible but form-retaining so as not to interfere with the expansion and contraction of the first member and yet properly support the first member from the vehicle.

4. In an assembly including a spare wheel carrier mounted on an automobile, a spare tire cover comprising a split substantially annular member formed to cover a part of the spare tire, and means attaching said member to the carrier, said member being expansible and contractible whereby the same may be interlocked with and released from a cover member for another part of the tire, said means being yieldable so as not to interfere with the expansion and contraction of said annular part.

5. In an assembly including a spare wheel carrier mounted on an automobile, a spare tire cover comprising a substantially circular member formed to surround the tread of the spare tire, means whereby said member is attached to the carrier, said member being expansible and contractible whereby the same may be interlocked with a cover member for another part of the tire, a cover member for another part of the tire, and means for supporting the second member from the wheel in position to be interlocked with the first member pending interlocking of said members.

6. Tire cover construction comprising a member formed to cover a part of a spare tire, means associated with said member for attaching the same to a vehicle, a cover member for another part of the tire, means for interlocking said members so as to support the second member from the first member, the first member being expansible and contractible and said attaching means being flexible but form-retaining so as not to interfere with the expansion and contraction of the first member and yet properly support the first member from the vehicle, and means for positively flexing the first member.

7. In a device for covering a spare tire on a spare wheel adapted to be mounted on a spare wheel carrier, a flexible ring member for covering a peripheral part of the tire, means carried by said ring member for attachment to the carrier, a second cover member formed to cover an adjacent peripheral part of the tire, and connecting means associated with said members and arranged to be interlocked when said ring member is flexed in one direction and released when said ring member is flexed in the other direction, said attaching means comprising a substantially central body portion for cooperating with the carrier and having a plurality of substantially form-retaining sections, secured to circumferentially spaced portions of said ring member, said attaching means being flexible so as not to interfere with the flexing of said ring member.

8. Tire cover construction comprising a member formed to cover a part of a spare tire, resilient means associated with said member for yieldably attaching the same to a vehicle, a cover member for another part of the tire, and releasable means for interlocking said members so as to support the second member from the first member, one of said members being flexible to selectively interlock and release said means.

9. Tire cover construction comprising a member formed to cover a part of a spare tire, means associated with said member for attaching the same to a vehicle, a cover member for another part of the tire, means for interlocking said members so as to support the second member from the first member, means for cushioning said members apart to prevent rattling therebetween, the first member being expansible and contractible and said attaching means being flexible but form-retaining so as not to interfere with the expansion and contraction of the first member and yet properly support the first member from the vehicle.

GEORGE ALBERT LYON.